(No Model.)

C. S. CANFIELD.
HORSESHOE.

No. 354,886. Patented Dec. 28, 1886.

Witnesses:
R. H. Sanford,
Richard Paul

Inventor
Charles S. Canfield,
By A. C. Paul,
Atty.

UNITED STATES PATENT OFFICE.

CHARLES S. CANFIELD, OF MINNEAPOLIS, MINNESOTA, ASSIGNOR OF ONE-HALF TO STANLEY M. UTTER, OF SAME PLACE.

HORSESHOE.

SPECIFICATION forming part of Letters Patent No. 354,886, dated December 28, 1886.

Application filed November 19, 1885. Serial No. 183,290. (No model.)

*To all whom it may concern:*

Be it known that I, CHARLES S. CANFIELD, a citizen of the United States, and a resident of Minneapolis, in the county of Hennepin and State of Minnesota, have invented certain Improvements in Removable Calks for Horseshoes, of which the following is a specification.

My invention relates to improvements in detachable or adjustable calks for horseshoes; and the objects I have in view are to provide horseshoes with calks that may readily be attached to or removed from any ordinary flat shoe.

It is desirable to remove the calks from a horse's shoes when the horse is to stand for any length of time in a stable, as it is considerably easier for him to stand on the flat shoes. Moreover, horses often cut themselves with the sharp calks on their shoes, either by stepping one foot on another or in lying down or getting up. It is also necessary with the ordinary shoe to remove the shoes once or sometimes even twice a week to sharpen the calks. This process injures the horse's feet, besides being quite expensive. My invention obviates all of these objections.

The invention consists, generally, in the construction and combination hereinafter described, and particularly pointed out in the claim.

Figure 1:
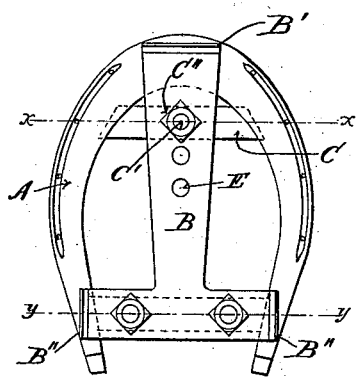
Figure 2:
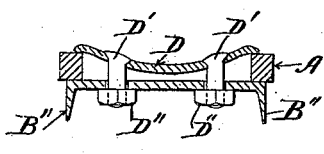
Figure 3:
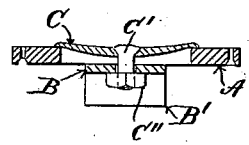
Figure 4:

In the drawings forming part of this specification, Figure 1 is a bottom plan view of a shoe with the calks attached. Fig. 2 is a section on line Y Y of Fig. 1. Fig. 3 is a section on line X X of Fig. 1. Fig. 4 is a side elevation.

In the drawings, A represents an ordinary horseshoe. It may be a shoe whose calks have become worn down so as to be smooth, or nearly so.

B represents a T-shaped steel plate, upon which the toe and heel calks are formed, or to which they are attached. The toe-calk B' is preferably formed by turning the end of the main part of the T-plate at right angles to the body and beveling it off on the inside, as shown in Fig. 4. The heel-calks are preferably formed by turning the ends of the cross part of the T-plate at right angles to the plate and sharpening said calks by beveling them on the inside, as shown in Fig. 2. The main part of the T-plate is provided with a number of holes, E, and the cross part with two holes located near the heel-calks.

C is a metal (preferably steel) bar, having a bolt, C', which is provided with a nut, C'', (see Fig. 3,) and projects downwardly from the bar. This bar is thinner at the ends, which are cut off obliquely, as indicated in Fig. 1.

D is a second metal bar of substantially the shape shown in Figs. 2 and 4. This bar is provided with the downwardly-projecting bolts D' D', having the nuts D'' D''.

In applying the calks to a horse's shoes the bar C is first inserted between the hoof and the top of the shoe and driven into position in the toe of the shoe, substantially as shown in Fig. 1. The nuts D'' D'' are loosened on the bolts D', and the bar D is inserted between the shoe and the hoof. One of the holes, E, is brought over the bolt C', so as to bring the toe-calk substantially even with the toe of the shoe. The nuts D'' D'' and C'' are then screwed up, and the plate and the calks are thereby securely held in place.

To remove the shoe the nut C'' is removed and the nuts D'' are loosened, the plate B is slipped off the bolt C', and the plate B and bar D are together removed from the shoe. The bar C is then removed. The calks can then be sharpened and the device replaced when desired.

The plate D is downwardly bent, as shown in Fig. 2, so that it will clear the frog of the foot.

The plates B and the bars D and C are all preferably formed of steel, so as to be thin and light. The three calks, being on the T-plate, tend to brace each other, and the whole device is strong and firm.

I claim as my invention—

The combination, with the shoe A, of the T-plate B, having calks B'' and B', the bar C, having bolt C' and nut C'', and the bar D, having bolts D' and nuts D'', all substantially as described, and for the purpose set forth.

In testimony whereof I have hereunto set my hand this 14th day of November, 1885.

CHARLES S. CANFIELD.

In presence of—
R. H. SANFORD,
A. C. PAUL.